United States Patent
Dey et al.

(10) Patent No.: US 10,031,973 B2
(45) Date of Patent: Jul. 24, 2018

(54) METHOD AND SYSTEM FOR IDENTIFYING A SENSOR TO BE DEPLOYED IN A PHYSICAL ENVIRONMENT

(71) Applicant: Tata Consultancy Services Limited, Mumbai, Maharashtra (IN)

(72) Inventors: Sounak Dey, West Bengal (IN); Ranjan Dasgupta, West Bengal (IN); Arpan Pal, West Bengal (IN); Prateep Misra, West Bengal (IN); Anupam Basu, West Bengal (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 409 days.

(21) Appl. No.: 14/492,807

(22) Filed: Sep. 22, 2014

(65) Prior Publication Data
US 2015/0261863 A1  Sep. 17, 2015

(30) Foreign Application Priority Data
Mar. 11, 2014  (IN) .......................... 816/MUM/2014

(51) Int. Cl.
*G06F 17/30* (2006.01)

(52) U.S. Cl.
CPC .... *G06F 17/30864* (2013.01); *G06F 17/3066* (2013.01); *G06F 17/30539* (2013.01); *G06F 17/30657* (2013.01); *G06F 17/30734* (2013.01)

(58) Field of Classification Search
CPC ......... G06F 17/30864; G06F 17/30539; G06F 17/30734; G06F 17/30657; G06F 17/3066
See application file for complete search history.

(56) References Cited

U.S. PATENT DOCUMENTS

| 7,299,160 B2 | 11/2007 | Hamdan | |
| 8,429,179 B1* | 4/2013 | Mirhaji | G06F 17/30312 707/756 |
| 2009/0106224 A1* | 4/2009 | Roulland | G06F 17/30646 |

(Continued)

OTHER PUBLICATIONS

Jirka et al. "Discovery Mechanisms for the Sensor Web", Sensors (2009), 9: 2661-2681.

(Continued)

*Primary Examiner* — Paul Kim
(74) *Attorney, Agent, or Firm* — HM Law Group LLP; Vani Moodley, Esq.

(57) ABSTRACT

Disclosed is a method and system for identifying a sensor to be deployed in a physical environment. The method may comprise storing sensor data and metadata of the plurality of sensors in a data store. Further, the method may comprise deriving sensor information comprising at least one of thematic information, temporal information, and spatial information. The method may further comprise creating sensor ontology to define a relationship between the sensor data, the metadata, and the sensor information. The sensor ontology may be stored in a knowledge repository of the data store. The method may further comprise receiving and decomposing the search query into at least one of a basic query component and an inferred query component. Finally, the method may comprise executing the basic query component or the inferred query component on the data store and the knowledge repository respectively in order to identify the sensor.

10 Claims, 4 Drawing Sheets

(56) References Cited

U.S. PATENT DOCUMENTS

2012/0161940 A1* 6/2012 Taylor .................... G01D 21/00
340/10.3
2013/0094403 A1* 4/2013 Park ..................... H04W 4/008
370/255

OTHER PUBLICATIONS

Perera et. al, "Sensor Search Techniques for Sensing as a Service Architecture for The Internet of Things" IEEE Sensors Journal, vol. XX, (2013) pp. 1-15.
Calbimonte et al.; "Semantic Sensor Data Search in a Large-Scale Federated Sensor Network" Semantic Sensor Networks (2011) pp. 14-29.
Semantic-Service Provisioning for the Internet of Things using Future Internet Research by Experimentation; Spitfire Handout.

* cited by examiner

METHOD AND SYSTEM FOR IDENTIFYING A SENSOR TO BE DEPLOYED IN A PHYSICAL ENVIRONMENT

CROSS-REFERENCE TO RELATED APPLICATIONS AND PRIORITY

This patent application claims the benefit of priority to India Patent Application No. 816/MUM/2014, filed on Mar. 11, 2014. The aforementioned application is incorporated herein by reference in its entirety.

TECHNICAL FIELD

The present disclosure described herein, in general, relates to systems and methods for identifying one or more sensors to be deployed in a physical environment, and particularly, in cyber physical systems.

BACKGROUND

In typical cyber-physical systems, various sensors are deployed in order to sense physical parameters including temperature, pressure, humidity, energy consumption, and the like. These sensors form one of the significant elements of the cyber physical systems. These sensors are of distinct types and are capable of generating heterogeneous data. The heterogeneous data may be captured and stored in a data store for future use. For example, the data stored in the data store may be utilized in order to provide various data analytic services.

However, the data captured may not be helpful in providing additional inferences, insights, and context specific information about the plurality of sensors. This is because, the data captured is indicative of values sensed from the sensors and hence may not be beneficial in understanding and deriving contextual information related to the sensors. There may be several sensors available in sensor domain having similar functionalities, similar capabilities, and similar features. Since the data store stores mere data values and is not capable to capture the additional contextual information associated to the sensors, it becomes a challenge to identify most appropriate sensor among several other sensors and to discover their services that satisfies application and use case requirements of a cyber physical system.

Further, it has been observed that the capabilities, the features, and the functionalities associated with the sensors may be modified over a period of time due to proliferation of sensor technologies. In such scenario, if the data store storing the data is not updated with the recent information pertaining to newer capabilities, features, and functionalities related to the sensors, the sensor selected by the user may not be fruitful. Further, it has been observed that while searching a sensor, the user may query the data store with one or more generic terms or related terms closely related to the information present in the data store. Since, one or more generic terms or the related terms does not match with the information present in the data store, there is a challenge of retrieving sensor information from the data store against such queries, and hence such queries may remain unresolved.

SUMMARY

This summary is provided to introduce aspects related to systems and methods for identifying a sensor to be deployed in a physical environment and the aspects are further described below in the detailed description. This summary is not intended to identify essential features of the claimed disclosure nor is it intended for use in determining or limiting the scope of the claimed disclosure.

In one implementation, a method for identifying a sensor, from a plurality of sensors, to be deployed in a physical environment is disclosed. The method may comprise storing sensor data and capturing metadata of the plurality of sensors in a data store. In one embodiment, the sensor data may be captured by the plurality of sensors. Further, the metadata belongs to the plurality of sensors. The metadata may comprise at least one of a measuring parameter, a feature, communication capability, a model name, a model number, a manufacturer detail, and the like. The method may further comprise deriving sensor information from at least one of the sensor data and the metadata. In one embodiment, the sensor information comprises at least one of thematic information, temporal information, and spatial information. The thematic information may indicate feature and measurement capabilities of the plurality of sensors. The temporal information may indicate time of the receipt of the sensor data. The spatial information indicates location of the plurality of sensors. Further, the method may comprise creating sensor ontology to define a relationship between the sensor data, the metadata, and the sensor information. In one embodiment, the sensor ontology may represent a semantic structure defined in a Resource Description Framework (RDF) format and may be stored in a knowledge repository of the data store. The method may comprise receiving and decomposing the search query into at least one of a basic query component and an inferred query component. The search query may be received in semantic form. In one embodiment, the basic query component may be associated to the sensor data. Further, the inferred query component may be associated to the sensor information. More particularly, the inferred query component may be capable of inferring sensor information from the knowledge repository. Before decomposition, the search query may be transformed into Simple Protocol and RDF Query Language (SPARQL) format or GeoSPARQL format. The search query transformed may comprise at least one of a thematic query component, a temporal query component, and a spatial query component. The method may further comprise executing the basic query component or the inferred query component on the data store and the knowledge repository respectively in order to identify the sensor. The inferred query executed on the knowledge repository may infer a sensor dataset from the sensor information present in the knowledge repository. The sensor dataset inferred may then be retrieved from the sensor data stored in the data store. Further, the method may comprise enriching the data store. The data store may be enriched by capturing new sensor data, new metadata, and new sensor information associated to one or more new sensors. Further, the data store may be enriched by implementing a web crawling technique to extract additional information about the plurality of sensors and the one or more new sensors from the web. Furthermore, the data store may be enriched by capturing related sensor information associated to the search query. The related sensor information may be captured using one or more text matching techniques comprising hyperonymy, hyponymy, and meronymy. In one embodiment, the storing, the deriving, the creating, the receiving and decomposing, the executing, and the enriching are performed by a processor using a set of instructions stored in a memory.

In another implementation, a system for identifying a sensor, from a plurality of sensors, to be deployed in a physical environment is disclosed. The system may comprise a processor and a memory coupled to the processor for executing a plurality of modules stored in the memory. The plurality of modules may comprise a data capturing module, a search engine module, and a data enriching module. The data capturing module may be configured to store sensor data and capture metadata of the plurality of sensors in a data store. In one embodiment, the sensor data may be captured by the plurality of sensors. Further, the metadata belongs to the plurality of sensors. The data capturing module may be further configured to derive sensor information from at least one of the sensor data and the metadata. In one embodiment, the sensor information comprises at least one of thematic information, temporal information, and spatial information. Further, the data capturing module may be configured to create sensor ontology to define a relationship between the sensor data, the metadata, and the sensor information. In one embodiment, the sensor ontology may be stored in a knowledge repository of the data store. The search engine module may be configured to receive the search query and decompose the search query into at least one of a basic query component and an inferred query component. In one embodiment, the basic query component may be associated to the sensor data. Further, the inferred query component may be associated to the sensor information. The search engine module may be configured to execute the basic query component or the inferred query component on the data store and the knowledge repository respectively in order to identify the sensor. The inferred query executed on the knowledge repository may infer a sensor dataset from the sensor information present in the knowledge repository. The sensor dataset inferred may then be retrieved from the sensor data stored in the data store. The data enriching module may be configured to enrich the data store by capturing new data, new metadata, and new sensor information associated to one or more new sensors. Further, the data enriching module may enrich the data store by implementing a web crawling technique to extract additional information about the plurality of sensors and the one or more new sensors from the web. Furthermore, the data enriching module may enrich the data store by capturing related sensor information associated to the search query. The related sensor information may be captured using one or more text matching techniques comprising hyperonymy, hyponymy, and meronymy.

In yet another implementation, a non-transitory computer readable medium embodying a program executable in a computing device for identifying a sensor, from a plurality of sensors, to be deployed in a physical environment is disclosed. The computer program may comprise a program code for storing sensor data and capturing metadata of the plurality of sensors in a data store. In one embodiment, the sensor data may be captured by the plurality of sensors. Further, the metadata belongs to the plurality of sensors. The computer program may further comprise a program code for deriving sensor information from at least one of the sensor data and the metadata. In one embodiment, the sensor information comprises at least one of thematic information, temporal information, and spatial information. Further, the computer program may comprise a program code for creating sensor ontology to define a relationship between the sensor data, the metadata, and the sensor information. In one embodiment, the sensor ontology may be stored in a knowledge repository of the data store. The computer program may further comprise a program code for receiving the search query and decomposing the search query into at least one of a basic query component and an inferred query component. In one embodiment, the basic query component may be associated to sensor data. Further, the inferred query component may be associated to the sensor information. The computer program may further comprise a program code for executing the basic query component or the inferred query component on the data store and the knowledge repository respectively in order to identify the sensor. The inferred query executed on the knowledge repository may infer a sensor dataset from the sensor information present in the knowledge repository. The sensor dataset inferred may then be retrieved from the sensor data stored in the data store.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
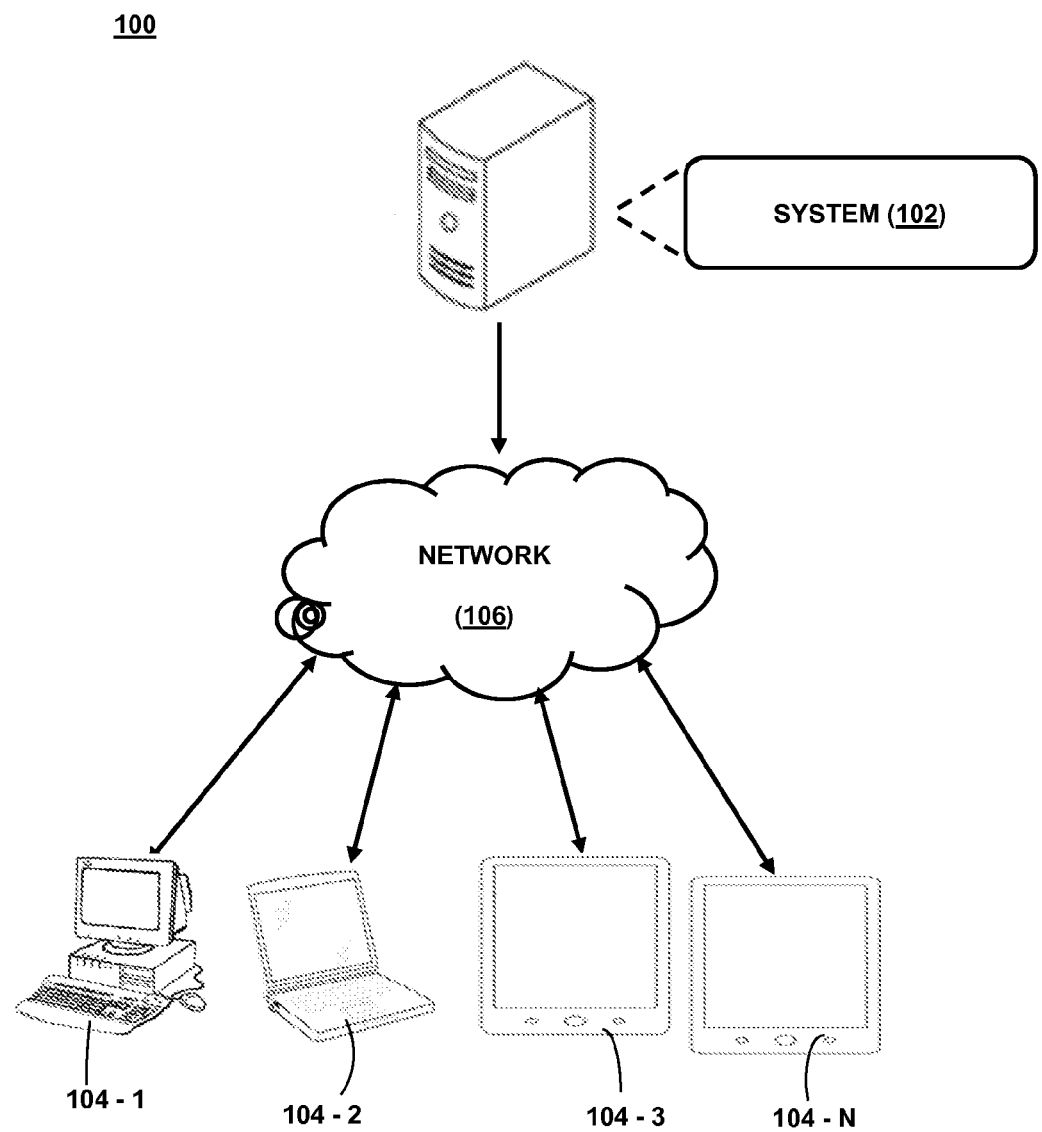
FIG. 1 illustrates a network implementation of a system for identifying a sensor to be deployed in a physical environment, in accordance with an embodiment of the present disclosure.

Systems and methods for identifying a sensor to be deployed in a physical environment are described. The systems and methods enable effective and efficient searching technique of identifying the sensor from a plurality of sensors based upon requirements of a user. In order to identify the sensor, initially time series data indicative of measurement values may be captured from the plurality of sensors. Further, metadata belonging to the plurality of sensors may be captured. The metadata indicates additional information associated to the plurality of sensors. In one example, the metadata may comprise sensing parameters, sensing features, measuring and communication capabilities of each sensor, and the like. The time series data and the metadata may be stored in a data store. Based upon the time series data and the metadata, sensor information may be derived. The sensor information may indicate one or more concepts associated to the plurality of sensors. The sensor information indicates annotations received from a plurality of subject matter experts (SMEs) in sensor application domain. The sensor information may comprise at least one of thematic information, temporal information, and spatial information.

Subsequent to the derivation of the sensor information, sensor ontology may be created for the plurality of sensors. The sensor ontology may define a relationship between the time series data, the metadata, and the sensor information. The sensor ontology may reside in the data store in form of a knowledge repository. A semantic search query received from the user may be divided into a thematic query component, a temporal query component, and a spatial query component. Further, the semantic search query may be decomposed into at least one of a basic query component and an inferred query component. The basic query component may be related to the time series data while the inferred query component may be related to the one or more concepts in the sensor ontology. Therefore, based upon the context of the application and the requirements of the user, the basic query component or the inferred query component may be executed on the data store and the knowledge repository respectively in order to identify the sensor.

In one embodiment, the data store and a knowledge repository present in the data store may be reasoned in order to identify a subset of the sensor data and a subset of the sensor information respectively. In one aspect, the subset of the sensor data and subset of the sensor information may be matching with the at least one of the basic query component and the inferred query component. In some embodiments, the sensor information present in the knowledge repository may be ranked based upon matching of the sensor information with one or more search queries received frequently on the knowledge repository. Further the one or more search queries may be ranked based upon frequency of receipt of the one or more search queries on the knowledge repository. The one or more search queries are further ranked based upon the rank of the sensor information matching with earlier search queries received on the knowledge repository.

In one embodiment, the knowledge repository may be frequently enriched over a period of time. The enrichment may be achieved by extracting additional information corresponding to the plurality of sensors from internet/web or an external resource using web crawling techniques or data extraction techniques, or extracting additional concepts related to one or more search terms in the semantic search query received from the user, or addition of time series data, metadata, and concepts for a set of new sensors.

While aspects of described system and method for identifying a sensor to be deployed in a physical environment may be implemented in any number of different computing systems, environments, and/or configurations, the embodiments are described in the context of the following exemplary system.

Referring now to FIG. 1, a network implementation 100 of a system 102 for identifying a sensor, from a plurality of sensors, to be deployed in a physical environment is illustrated, in accordance with an embodiment of the present disclosure. In one embodiment, the system 102 may be configured to store sensor data and capture metadata of the plurality of sensors in a data store. In one embodiment, the sensor data may be captured by the plurality of sensors. Further, the metadata belongs to the plurality of sensors. The system 102 may be further configured to derive sensor information from at least one of the sensor data and the metadata. In one embodiment, the sensor information comprises at least one of thematic information, temporal information, and spatial information. Further, the system 102 may be configured to create sensor ontology to define a relationship between the sensor data, the metadata, and the sensor information. In one embodiment, the sensor ontology may be stored in a knowledge repository of the data store. The system 102 may be further configured to receive the search query and decompose the search query into at least one of a basic query component and an inferred query component. In one embodiment, the basic query component may be associated to the sensor data. Further, the inferred query component may be associated to the sensor information. The system 102 may further be configured to execute the basic query component or the inferred query component on the data store and the knowledge repository respectively in order to identify the sensor. The system 102 may be constantly configured to enrich the data store over a period of time.

Although the present disclosure is explained considering that the system 102 is implemented as a server, it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2 . . . 104-N, collectively also referred to as a user device 104, or a user 104, hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
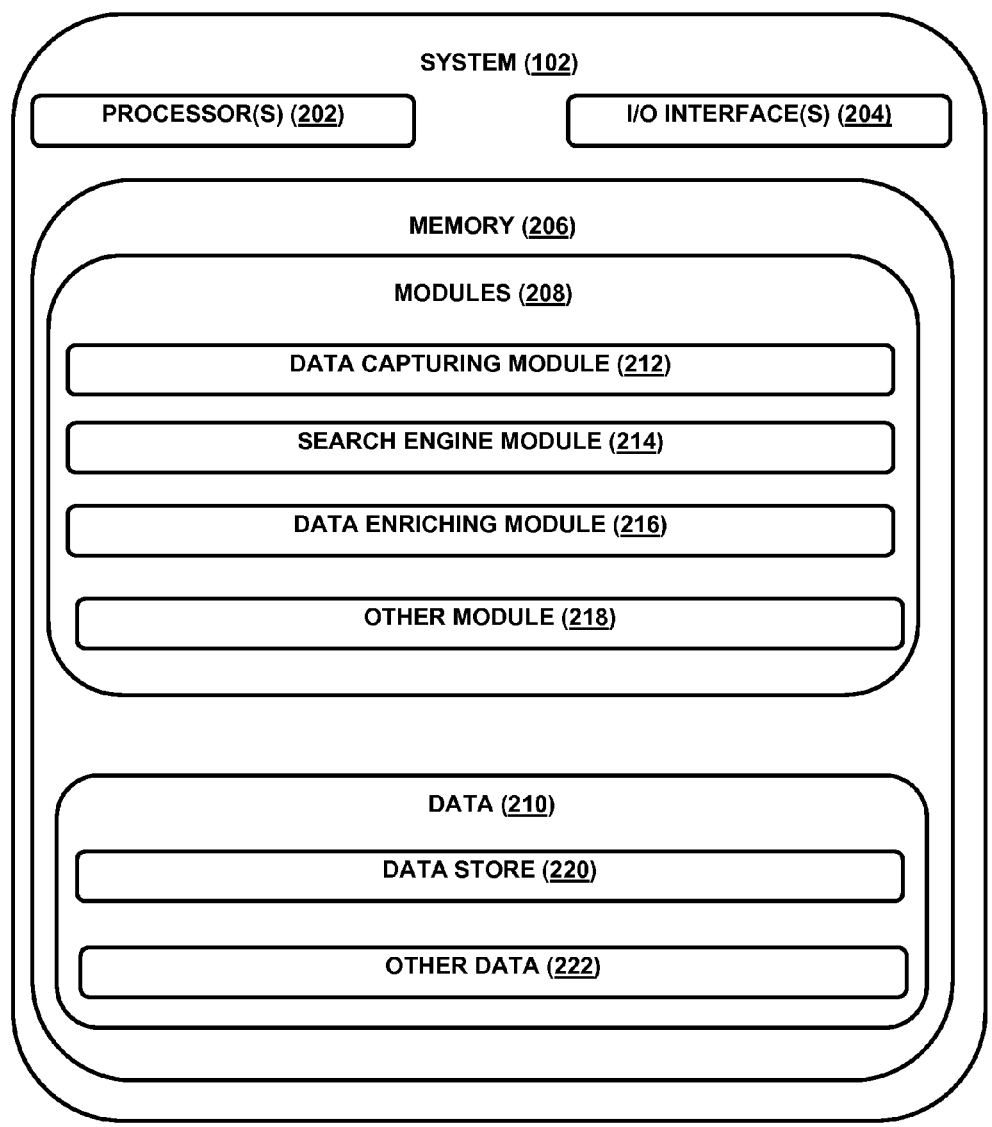
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a data capturing module 212, a search engine module 214, a data enriching module 216, and other module 218. The other module 218 may include programs or coded instructions that supplement applications and functions of the system 102.

The data 210, amongst other things, serves as a repository for storing data processed, received, and generated by one or more of the modules 208. The data 210 may also include a data store 220 and other data 222. The other data 222 may include data generated as a result of the execution of one or more modules in the other module 218.

In one implementation, at first, a user may use the user device 104 to access the system 102 via the I/O interface 204. The user may register themselves using the I/O interface 204 in order to use the system 102. The working of the system 102 using the plurality of modules 208 is explained in detail referring to FIGS. 3 and 4 as explained below.

Data Capturing Module 212

Figure 3:
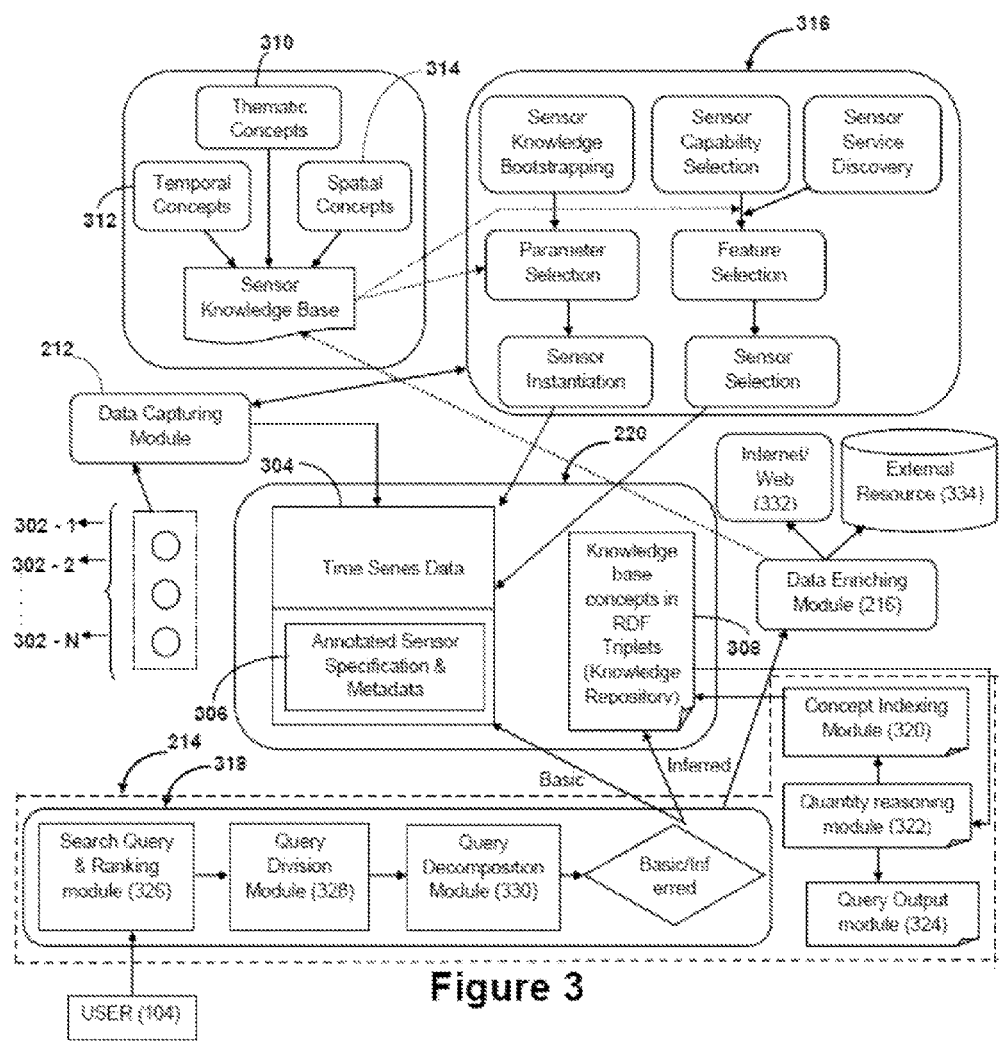
FIG. 3 illustrated various modules and/or components of the system, in accordance with an embodiment of the present disclosure.

In an embodiment, working of the data capturing module 212 along with other components of the system 102 is explained referring to FIG. 3. As shown in FIG. 3, the data capturing module 212 may be configured to capture time series sensor data 304, hereinafter referred to as sensor data 304, from a plurality of sensors 302-1, 302-2 . . . 302-N, hereinafter referred to as sensors 302. The sensor data 304 may indicate measurement values captured by the sensors 302. Further, the data capturing module 212 may be configured to capture annotated specification and metadata 306, hereinafter referred to as metadata 306 belonging to the sensors 302. The metadata may comprise at least one of a measurable range, a feature, a communication capability, a model name, a model number, a manufacturer detail, and the like. The sensor data 304 and the metadata 306 may be stored in the data store 220.

After the storage of the sensor data 304 and the metadata 306 in the data store 220, the data capturing module 212 may be configured to derive sensor information, also referred hereinafter as concepts, from the sensor data 304 and the metadata 306. Specifically, the sensor information comprises thematic information (also referred hereinafter as thematic concepts), temporal information (also referred hereinafter as temporal concepts), and spatial information (also referred hereinafter as spatial concepts). Based upon the sensor information, the data capturing module 212 may be configured to create sensor ontology in form of knowledge based concepts in RDF triplets, hereinafter referred to as a knowledge repository 308. The knowledge repository 308 may define relationship between the sensor data 304, the metadata 306, and the sensor information.

As illustrated in FIG. 3, the knowledge repository 308 may be created based upon thematic concepts 310, temporal concepts 312, and spatial concepts 314. In one embodiment, the thematic concepts 310 may indicate feature and measurement capabilities of the sensors 302, the temporal concepts 312 may indicate time of the receipt of the sensor data 304 from the sensors 302, and the spatial concepts 314 may indicate location of the sensors 302. Thus, the knowledge repository 308 tags the sensor data 304 and the metadata 306 with a time, a location, and a theme associated to the sensors 302 in form of RDF triplets in the data store 220. The data capturing module 212 may be configured to create the knowledge repository 308 by implementing a plurality of sensor search and selection services 316. The functionalities of the plurality of sensor search and selection services 316 are explained hereinafter in detail.

The knowledge repository 308 may define a placeholder for different concepts associated to the sensors 302 and a hierarchy of the concepts. A sensor knowledge bootstrapping service of the search and selection services 316, via a sensor instantiation service, may assist sensor domain experts to treat a top-level concept as an initial seed and then induce other related concepts in a bootstrapping manner until the desired path is reached. The sensor ontology comprises detail knowledge of sensor type, sensor hierarchy, general factsheets, sensor capabilities like working range, accuracy, data communication protocols and their interdependencies among sensor parameters. A sensor capability service of the search and selection services 316 may assist the sensor domain experts to select the right position from the sensor hierarchy and select sensor features, via a feature selection service, and capabilities or categories, via a sensor capability selection service, relevant to a sensor and hence enable crafting a new sensor into the system 102. As domain knowledge evolves over time, such incremental approach can accommodate new changes by updating existing knowledge in the knowledge repository 308.

Once the sensor metadata is defined in the knowledge repository 308, a sensor and sensing service discovery service of the search and selection services 316 is implemented by the data capturing module 212 in order to retrieve the thematic information, the temporal information, and the spatial information. The thematic information, the temporal information and the spatial information are retrieved in order to facilitate analyzing and resolving complex search queries that may be received from the user 104 for search and selection, and thereby identifying the sensor. The sensor and sensing service discovery service may be configured to query the sensor in order to obtain information about factsheet, metadata, and capabilities of the sensor and thereby ensuing reliability of the sensor data. The sensor and sensing service discovery service may help the user 104 to identify the right sensors and their capability using the knowledge repository 308 storing interrelations among entities associated with the sensors and using a defined set of rules for quantitative reasoning for a given use case requirement of the user 104.

Thus, the data capturing module 212 creates sensor ontology in form of the knowledge repository 308 comprising hierarchical information of the sensors 302, properties of the sensors 302, feature of interest of the sensors 302, measuring capabilities of the sensors 302, communication capabilities of the sensors 302, and all related context information in either concept form or annotation form. Further, known relationships between the sensors 302, the sensor data 304, the metadata 306 and the concepts are defined in the knowledge repository 308. The sensor ontology may allow capturing and modeling context properties related to the sensors 302. The sensor instantiation service enables the sensor domain experts to interlace off new sensors in the knowledge repository 308. Further, sensor capability selection service and sensor discovery service collectively helps the user 104 to search and select sensors which satisfy the requirements of their respective use cases. Relevant sensor may be indentified and/or searched by implementing reasoned based query on the sensor data 304, the metadata 306, and the knowledge repository 308 stored in the data store.

The searching of the senor is facilitated via the search engine module 214, details of which are explained hereinafter as below.

Search Engine Module 214

The user 104 may query the data store 220 in order to identify or search for the sensor capable of serving the requirements associated to the user 104. As illustrated in FIG. 3, the search engine module 214 may further comprise a query interpreter module 318, a concept indexing module 320, a quantity reasoning module 322, and a query output module 324. The query interpreter module 318 and the quantity reasoning module 322 may be configured to respond to search queries received from the users 104 regarding the sensor data and the metadata. The concept indexing module 320 may be configured to index the concepts stored in the knowledge repository 308 in order to enable faster and efficient search of the sensors. The query interpreter module 318 may further comprise a search query & ranking module 326, a query division module 328, and a query decomposition module 330. The search query & ranking module 326 may be configured to receive a search query from the user 104. The search query may contain semantic terms related to the sensors 302.

On receiving the search query, the query division module 328 may be configured to transform the search query into standard GeoSPARQL format or a SPARQL format. The search query may be transformed into the GeoSPARQL format or a SPARQL format based upon one or more keywords present in the search query. In one example, consider an exemplary search query "Find out all EnergyMeters which can measure consumption" is received from the user 104. From the exemplary search query, keywords comprising EnergyMeters and measure consumption may be selected for transforming the exemplary search query into the SPARQL format. Specifically, an exemplary SPARQL query may be formed from the keywords which will be of following type:
SELECT*WHERE{?em rdf:type:EnergyMeter. ?em:Has-Capability:MeasureConsumption}

Similarly, based upon various complex search queries received from the users 104, various SPARQL or Geo SPARQL queries may be generated. Further, each complex query may be divided into a sub-query, and for each sub-query an independent SPARQL query may be constructed. Each independent SPARQL query may be executed in parallel on the data store 220 in order to search and select a sensor relevant to the search query received from the user 104. The parallel execution of independent SPARQL query may assist in improving searching efficiency of the at least one processor 202 of the system 102.

After the transformation of the search query into either the GeoSPARQL format or the SPARQL format, the query division module 328 may be further configured to divide the query into query components relevant to the concepts defined in the knowledge repository 308. For example, the query division module 328 may divide the search query into the query components such as a temporal query component, a spatial query component, a thematic query component, and the like. In one example, the spatial query component may be like "Find all temperature sensors near to the north block of the building". Similarly, the temporal query component may be like "Find all wind sensor data during yesterday's Norwester". Further, the thematic query component may be like "find the entire local manufactured high precession accelerometer sensor having capability of sending alert crosses the threshold". The thematic concepts, the temporal concepts and spatial concepts that may be related to the thematic query component, the temporal query component, and the spatial query component may be included into the knowledge repository 308. The sensor data 304 and the metadata may be annotated with thematic concepts, the temporal concepts and spatial concepts or may be inferred during resolving of the search query so that queries are satisfied by the query interpreter module 318 and the quantity reasoning module 322.

Subsequent to the division of the user search query into the query components, the query decomposition module 330 may be configured to decompose the query components into a basic query component or an inferred query component. The basic query component may be associated with the data store 220 while the inferred query component may be associated with the knowledge repository 308. The inferred query component may be used for inferring a concept from the concepts stored in the knowledge repository 308. The concept inferred may be related to a sensor dataset from the sensor data 304 stored in the data store 220. The basic query component and the inferred query component may be executed on the data store 220 and the knowledge repository 308 in order to identify a sensor of the sensors 302 that satisfies use case requirements of the user 104.

In one example, consider the search query received from the user 104 is "Find out the energy sensor in Zone 1 having capability of measuring consumption and recorded consumption during peak hour". In this example, the search query may comprise inferred queries such as a spatial query "energy sensor in zone 1" (associated to a spatial concept), a thematic query "measuring consumption capability" (associated to a thematic concept), and a temporal query "measurement done during peak hour" (associated to a temporal concept). These inferred queries may be executed by the quantity reasoning module 322, via the concept indexing module 320, on the knowledge repository 308 in order identify one or more sensor satisfying the search query.

In one embodiment, the quantity reasoning module 322 may reason the knowledge repository 308 in order to infer one or more concepts stored in the knowledge repository 308. Specifically, considering the aforementioned example, the quantity reasoning module 322 may be configured to execute the spatial query "energy sensor in zone 1" on the knowledge repository 308 in order to identify energy sensors in the zone 1. Further, after the identification of the energy sensor in the zone 1, the quantity reasoning module 322 may be configured to execute the thematic query "measuring consumption capability" on the knowledge repository 308 in order to identify few set of the energy sensors in the zone 1 which may be tagged to a concept "MeasureConsumption" in the knowledge repository 308. Specifically, the "MeasureConsumption" concept may be associated with a tuple of energy and power that is indicative of sensors satisfying consumption measurement capabilities. Further, after the identification of the few set of sensors, the quantity reasoning module 322 may be configured to execute the temporal query "measurement done during peak hour" on the knowledge repository 308 in order to identify at least one sensor of the few set of energy sensors that is capable of sensing energy consumption during peak hour and does not sleep in the peak hour. Then the energy and power of the at least one sensor is retrieved from the data store 220. The energy consumption in form of the tuple comprising the power and the energy of the at least one sensor may be displayed as a result to the user 104 via the query output module 324.

In one embodiment, the search query & ranking module 326 may be configured to rank the concepts stored in the knowledge repository 308 based upon search queries received and results obtained in respond to the search queries. Specifically, based upon the frequency of occurrence of particular search queries, or keywords, synonyms and related terms associated with the said queries, the ranking of concepts matching the frequently occurring search queries may be enhanced or updated with the help of the concept indexing module 320. Such enhancement in the ranking enables faster retrieval of concepts matching the frequently occurring search queries. Further, the search query & ranking module 326 may further be configured to rank the search queries received on the knowledge repository 308. The search queries may be ranked based upon frequency of occurrence each search query, such that a search query received more frequently ranked higher as compared to another search query received less frequently on the on the knowledge repository 308. Based upon the ranking of the search queries, the search query received more frequently may be interpreted and responded quickly with search results as compared to the search query received less frequently. This enables in faster processing of searching and thereby retrieval of search results in form of the required sensor data. In one embodiment, the data store 220 comprising the sensor data 304, the metadata 306, and the knowledge repository 308 may be frequently updated, via a data enriching module 216, over a period of time based upon arrival of new sensor, or based upon the search query received from the user 104, or extraction of additional information about the sensors from an internet/web using web crawling techniques. The functionalities of the data enriching module 216 are explained in detail hereinafter.

Data Enriching Module 216

In one embodiment, the data enriching module 216 may be configured to enrich the data store 220 by introducing a new sensor and thereby new sensor data, new metadata and new concepts associated to the new sensor. It must be understood and appreciated that numerous sensors are evolving with the proliferation of sensor technologies, and therefore features, capabilities, parameters associated to the new sensors may be added in the data store 220. Further, features and capabilities of existing sensors may be modified or new features may be added to the existing sensors, and therefore the data store 220 needs to be updated accordingly. As sensor domain knowledge proliferates, domain experts may add new feature concepts which should be induced by the data store 220 of the system 102.

Further, the data enriching module 216 may be configured to enrich the data store 220 based upon the search query received from the user 104. The search query may comprise generic terms. Such generic terms may not be defined in the data store 220 and thus the search query may fail to identify the desired sensor data. In order to avoid such situations, the data enriching module 216 may be configured to implement various text matching techniques known in the art so that related query terms or nearly related terms or related concepts may be identified and linked together to establish relationship amongst them in the data store 220. Such relationship is established using techniques comprising hyperonymy, hyponymy, meronymy, and the like.

Further, as illustrated in FIG. 3, the data enriching module 216 may be configured to implement information extraction methodologies/techniques on an internet/web 332 or an external resource 334 in order to extract additional information about the sensors 302. The external resource 334 may include an external database capable of storing structured and/or unstructured data related to the sensors 302. The data enriching module 216, via the information extraction methodologies/techniques, may be enabled to parse structured or unstructured data available in the internet/web 332 or the external resource 334 and thereby extract useful information and new inferences thereof to define a new relation or a new concept into existing hierarchy/relations present in the data store 220. To enhance the data store 220, a web crawler (not shown in figure) may be used in order to parse/crawl the related structured and unstructured data available in the internet/web 332. Further the structured or unstructured data in the external resource 334 may be parsed using the information extraction techniques known in the art. In one example, the information extraction techniques may comprise singular value decomposition (SVD), Hidden Markov model (HMM), Natural language processing (NLP), and the like. Thus, the data enriching module 216 ensures enhancing/updating the information available in the data store 220, such that the user 104 is enabled to identify the appropriate sensor based on the recently updated information present in the data store 220.

Exemplary embodiments discussed above may provide certain advantages. Though not required to practice aspects of the disclosure, these advantages may include those provided by the following features.

Some embodiments of the present disclosure enable to provide a data store facilitating common sensor description and sensor data modeling using sensor ontology.

Some embodiments of the present disclosure enable resolving thematic, temporal and spatial queries using the query interpreter module and the quantity reasoning module.

Some embodiments of the present disclosure facilitate context-aware and/or use-case dependent sensor search and selection.

Some embodiments of the present disclosure updating and enriching the data store from structured or unstructured data using SVD, HMM, NLP and other information retrieval (IR) techniques.

Figure 4:
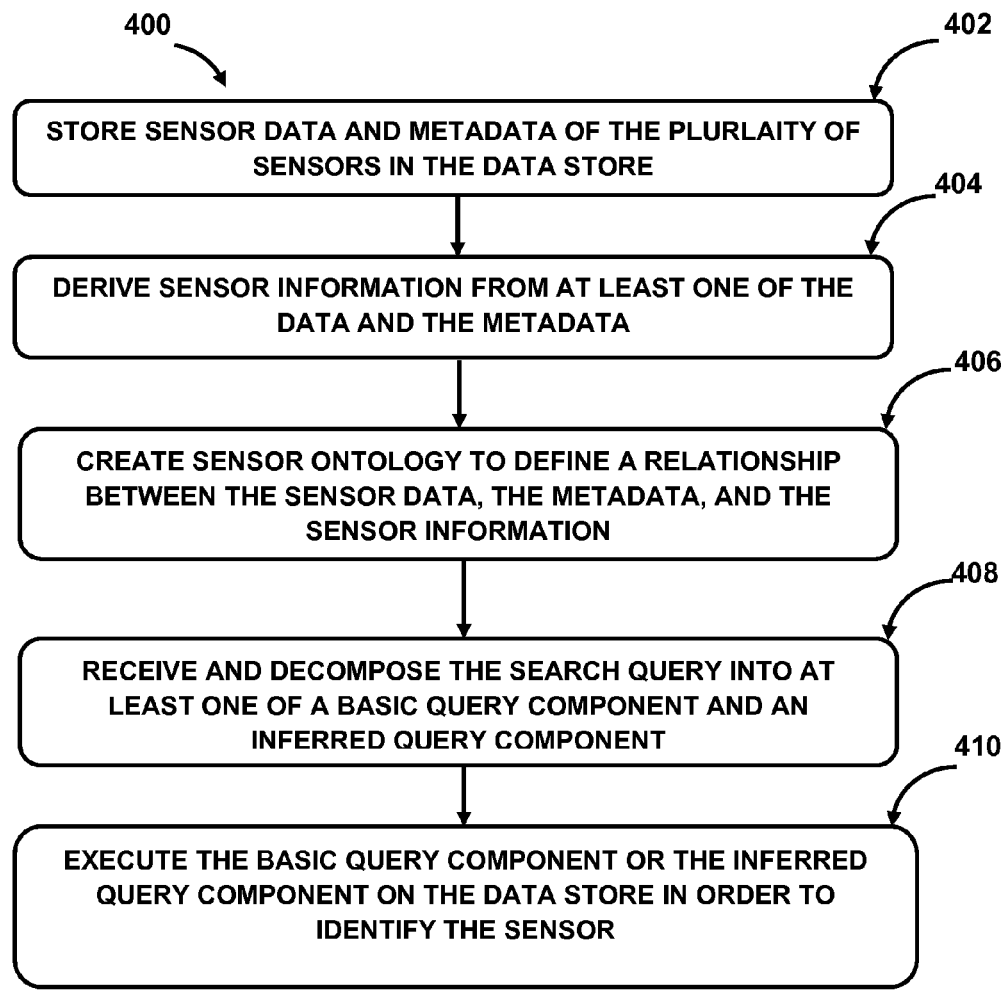
FIG. 4 illustrates a method for identifying a sensor to be deployed in a physical environment, in accordance with an embodiment of the present disclosure.

Referring now to FIG. 4, a method 400 for identifying a sensor, from a plurality of sensors, to be deployed in a physical environment is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented in the above described system 102.

At block 402, sensor data and metadata of the plurality of sensors may be stored in the data store 220. In one implementation, the sensor data and the metadata may be stored in the data store 220 by the data capturing module 212. The sensor data may be captured by the plurality of sensors and the metadata may belong to the plurality of sensors.

At block 404, sensor information may be derived from at least one of the sensor data and the metadata. The sensor information comprises at least one of thematic information, temporal information, and spatial information. In one implementation, the sensor information may be derived by the data capturing module 212.

At block 406, sensor ontology defining a relationship between the sensor data, the metadata, and the sensor information may be created. In one implementation, the sensor ontology may be created by the data capturing module 212. Further, the sensor ontology created may be stored in the data store 220 in form of a knowledge repository.

At block 408, search query may be received and decomposed into at least one of a basic query component and an inferred query component. The basic query component may be associated to the sensor data. The inferred query component may be associated to the sensor information. In one implementation, the search query may be received and decomposed by the search engine module 214.

At block 410, the basic query component or the inferred query component may be executed on the data store and the knowledge repository respectively in order to identify the sensor. In one implementation, the basic query component or the inferred query component may be executed by the search engine module 214.

Although implementations for methods and systems for searching, identifying and selecting a sensor to be deployed in a physical environment and thereby discovering services have been described in language specific to structural features and/or methods, it is to be understood that the appended claims are not necessarily limited to the specific features or methods described. Rather, the specific features and methods are disclosed as examples of implementations for searching, identifying and selecting a sensor to be deployed in a physical environment and thereby discovering services.

We claim:

1. A method for identifying a sensor, from a plurality of sensors, to be deployed in a physical environment, the method comprising:
   storing sensor data and metadata of the plurality of sensors in a data store, wherein the sensor data is captured by the plurality of sensors, and wherein the metadata belongs to the plurality of sensors;
   deriving sensor information from at least one of the sensor data and the metadata, wherein the sensor information comprises at least one of thematic information, temporal information, and spatial information;
   creating sensor ontology to define a relationship between the sensor data, the metadata, and the sensor information, wherein the sensor ontology is stored in the data store;
   receiving and decomposing one or more search queries into at least one of a basic query component and an inferred query component, wherein the basic query component is associated to the sensor data, and wherein the inferred query component is associated to the sensor information;
   identifying a subset of sensor data and a subset of sensor information, wherein the subset of sensor data and the subset of sensor information are matching with the at least one of the basic query component and the inferred query component;
   ranking the one or more search queries based upon frequency of receipt of the one or more search queries on a knowledge repository, wherein the one or more search queries are further ranked based on the identified subset of sensor data and the subset of sensor information, and wherein the sensor information is matching with the one or more search queries received on the knowledge repository; and
   executing at least one of the basic query component and the inferred query component on the data store in order to identify the sensor, and wherein the storing, the deriving, the creating, the receiving and decomposing, and the executing are performed by the processor using a set of instructions stored in a memory.

2. The method of claim 1, wherein the metadata comprises at least one of a measurable range, a feature, communication capability, a model name, a model number, and a manufacturer detail.

3. The method of claim 1, wherein the thematic information indicates feature and measurement capabilities of the plurality of sensors, and wherein the temporal information indicates time of the receipt of the sensor data, and wherein the spatial information indicates location of the plurality of sensors.

4. The method of claim 1, wherein the sensor ontology represents a semantic structure defined in a Resource Description Framework (RDF) format, and wherein the sensor ontology is further stored in a knowledge repository of the data store.

5. The method of claim 1, wherein the search query is in semantic form, and wherein, before decomposing, the search query is divided into a Simple Protocol and RDF Query Language (SPARQL) format or a GeoSPARQL format.

6. The method of claim 5, wherein the search query divided comprises at least one of a thematic query component, a temporal query component, and a spatial query component.

7. The method of claim 1, further comprising enriching the data store, via the processor, by,
   capturing new data, new metadata, and new sensor information associated to one or more new sensors,
   implementing a web crawling technique or information extraction technique to extract additional information about the plurality of sensors and the one or more new sensors from internet or an external resource, and
   capturing related sensor information associated to the search query, wherein the related sensor information is captured using one or more text matching techniques comprising hyperonymy, hyponymy, and meronymy.

8. A system for identifying a sensor, from plurality of sensors, to be deployed in a physical environment, the system comprising:
   a processor;
   a memory coupled to the processor, wherein the processor is capable for executing a plurality of modules stored in the memory, and wherein the plurality of modules comprising:
   a data capturing module configured to, store sensor data and metadata of the plurality of sensors in a data store, wherein the sensor data is captured by the plurality of sensors, and wherein the metadata belongs to the plurality of sensors, derive sensor information from at least one of the sensor data and the metadata, wherein the sensor information comprises at least one of thematic information, temporal information, and spatial information, and create sensor ontology to define a relationship between the sensor data, the metadata, and the sensor information, wherein the sensor ontology is stored in the data store;

a search engine module configured to,
receive and decompose one or more search queries into at least one of a basic query component and an inferred query component, wherein the basic query component is associated to the sensor data, and wherein the inferred query component is associated to the sensor information, and identify a subset of sensor data and a subset of sensor information, wherein the subset of sensor data and the subset of sensor information are matching with the at least one of the basic query component and the inferred query component; and a ranking module configured to:
rank the one or more search queries based upon frequency of receipt of the one or more search queries on a knowledge repository, wherein the one or more search queries are further ranked based on the identified subset of sensor data and the subset of sensor information, and wherein the sensor information is matching with the one or more search queries received on the knowledge repository, and execute at least one of the basic query component and the inferred query component on the data store in order to identify the sensor.

9. The system of claim 8, further comprising a data enriching module configured to enrich the data store by,
capturing new data, new metadata, and new sensor information associated to one or more new sensors,
implementing a web crawling technique or an information extraction technique to extract additional information about the plurality of sensors and the one or more new sensors from an internet or an external resource, and
capturing related sensor information associated to the search query, wherein the related sensor information is captured using one or more text matching techniques comprising hyperonymy, hyponymy, and meronymy.

10. A non-transitory computer readable medium embodying a program executable in a computing device for identifying a sensor, from plurality of sensors, to be deployed in a physical environment, the computer program comprising:

a program code for storing sensor data and metadata of the plurality of sensors in a data store, wherein the sensor data is captured by the plurality of sensors, and wherein the metadata belongs to the plurality of sensors;

a program code for deriving sensor information from at least one of the sensor data and the metadata, wherein the sensor information comprises at least one of thematic information, temporal information, and spatial information;

a program code for creating sensor ontology to define a relationship between the sensor data, the metadata, and the sensor information, wherein the sensor ontology is stored in the data store;

a program code for receiving and decomposing one or more search queries into at least one of a basic query component and an inferred query component, wherein the basic query component is associated to the sensor data, and wherein the inferred query component is associated to the sensor information;

a program code for identifying a subset of sensor data and a subset of sensor information, wherein the subset of sensor data and the subset of sensor information are matching with the at least one of the basic query component and the inferred query component;

a program code for ranking the one or more search queries based upon frequency of receipt of the one or more search queries on a knowledge repository, wherein the one or more search queries are further ranked based on the identified subset of sensor data and the subset of sensor information, and wherein the sensor information is matching with the one or more search queries received on the knowledge repository; and a program code for executing at least one of the basic query component and the inferred query component on the data store in order to identify the sensor.

* * * * *